(12) United States Patent
Fakkeldij et al.

(10) Patent No.: US 10,280,048 B2
(45) Date of Patent: May 7, 2019

(54) AUTOMATED CRANE CONTROLLER TAKING INTO ACCOUNT LOAD- AND POSITION-DEPENDENT MEASUREMENT ERRORS

(71) Applicant: SIEMENS AKTIENGESELLSCHAFT, München (DE)

(72) Inventors: Robert Fakkeldij, Eckental (DE); Uwe Ladra, Erlangen (DE); Alois Recktenwald, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 69 days.

(21) Appl. No.: 15/550,246

(22) PCT Filed: Dec. 30, 2015

(86) PCT No.: PCT/EP2015/081439
§ 371 (c)(1),
(2) Date: Aug. 10, 2017

(87) PCT Pub. No.: WO2016/128101
PCT Pub. Date: Aug. 18, 2016

(65) Prior Publication Data
US 2018/0050889 A1    Feb. 22, 2018

(30) Foreign Application Priority Data

Feb. 11, 2015 (EP) .................................... 15154677

(51) Int. Cl.
*F16F 7/10* (2006.01)
*B66C 13/48* (2006.01)
(Continued)

(52) U.S. Cl.
CPC ............ *B66C 13/48* (2013.01); *B66C 13/085* (2013.01); *B66C 19/007* (2013.01);
(Continued)

(58) Field of Classification Search
None
See application file for complete search history.

(56) References Cited

U.S. PATENT DOCUMENTS 4,753,357 A      6/1988  Miyoshi et al.
5,154,561 A  *  10/1992  Lee ......................... B63B 27/12
                                                              114/264
(Continued)

FOREIGN PATENT DOCUMENTS

CN         86108688 A      7/1987
CN        103339056 A     10/2013
(Continued)

*Primary Examiner* — Michael Lebentritt
(74) *Attorney, Agent, or Firm* — Henry M. Feiereisen LLC

(57) ABSTRACT

A control method for a handling system includes when a trolley is loaded at a target location by a target loading, matching by a crane controller the target location of the trolley on a crossmember with a target location of a load handling point on the substrate, such that a target load is lowered onto the target location of the load handling point, when the target load is lowered at the target location of the trolley, positioning the trolley at the target location by the crane controller, subsequently lowering the target load onto the load handling point by the crane controller and positioning the load handling point at the target location before the target load is lowered onto the load handling point, when the load handling point is movable on the substrate and the load handling point is controlled by the crane controller.

15 Claims, 7 Drawing Sheets

(51) Int. Cl.
  *B66C 13/08* (2006.01)
  *B66C 19/00* (2006.01)
  *B66C 13/06* (2006.01)
  *F16F 15/00* (2006.01)

(52) U.S. Cl.
  CPC .......... *F16F 7/1011* (2013.01); *B66C 13/066* (2013.01); *F16F 15/002* (2013.01)

(56) References Cited

U.S. PATENT DOCUMENTS

| | | | |
|---|---|---|---|
| 5,272,877 A * | 12/1993 | Fukushima | B66C 23/84 60/327 |
| 5,526,946 A * | 6/1996 | Overton | B66C 13/063 212/275 |
| 5,961,563 A * | 10/1999 | Overton | B66C 13/063 212/272 |
| 6,825,633 B2 | 11/2004 | Hamann et al. | |
| 6,880,712 B2 * | 4/2005 | Uchida | B66C 13/46 212/270 |
| 7,032,763 B1 * | 4/2006 | Zakula, Sr. | B66C 13/48 212/270 |
| 7,137,771 B2 * | 11/2006 | Maurer | B66C 13/085 414/334 |
| 7,152,503 B2 | 12/2006 | Ladra et al. | |
| 7,208,901 B2 | 4/2007 | Ladra et al. | |
| 7,261,351 B1 * | 8/2007 | Lee | B66C 1/663 294/81.1 |
| 7,566,193 B2 | 7/2009 | Haj-Fraj et al. | |
| 7,654,746 B2 | 2/2010 | Ladra et al. | |
| 7,800,334 B2 | 9/2010 | Hamann et al. | |
| 7,818,087 B2 | 10/2010 | Birzer et al. | |
| 7,950,639 B2 | 5/2011 | Ladra et al. | |
| 8,040,017 B2 | 10/2011 | Ladra et al. | |
| 8,146,814 B2 * | 4/2012 | Mueller | G06K 7/10811 235/375 |
| 8,157,752 B2 | 4/2012 | Ladra et al. | |
| 8,267,264 B2 * | 9/2012 | Bryfors | B66C 19/002 212/270 |
| 8,763,771 B2 | 7/2014 | Ladra et al. | |
| 9,316,283 B2 | 4/2016 | Ladra et al. | |
| 9,495,654 B2 * | 11/2016 | Hama | G06Q 10/06315 |
| 9,611,126 B2 * | 4/2017 | Holmberg | B66C 13/085 |
| 9,776,838 B2 * | 10/2017 | Sorensen | B66C 13/06 |
| 2002/0191813 A1 * | 12/2002 | Uchida | B66C 13/085 382/100 |
| 2003/0034183 A1 * | 2/2003 | Kortesmaki | B66F 9/0755 177/142 |
| 2004/0030478 A1 * | 2/2004 | Holland | B65G 63/004 701/50 |
| 2005/0131574 A1 * | 6/2005 | Takehara | G06Q 10/08 700/213 |
| 2005/0247657 A1 * | 11/2005 | Sparenborg | B66C 13/16 212/325 |
| 2007/0289931 A1 * | 12/2007 | Henriksson | B66C 13/063 212/274 |
| 2008/0257667 A1 | 10/2008 | Hamann et al. | |
| 2009/0008351 A1 * | 1/2009 | Schneider | B66C 13/063 212/272 |
| 2009/0050593 A1 * | 2/2009 | Ladra | B66C 13/063 212/275 |
| 2009/0278019 A1 | 11/2009 | Hamann et al. | |
| 2010/0178123 A1 | 7/2010 | Ladra et al. | |
| 2013/0085607 A1 | 4/2013 | Ladra et al. | |
| 2013/0147640 A1 | 6/2013 | Stocker | |
| 2013/0251498 A1 * | 9/2013 | Dahlen | B66C 13/40 414/802 |
| 2015/0360918 A1 * | 12/2015 | Ko | B66C 13/12 212/276 |
| 2016/0009531 A1 * | 1/2016 | Saliba | B66C 13/48 701/19 |

FOREIGN PATENT DOCUMENTS

| | | |
|---|---|---|
| CN | 105712177 A | 6/2016 |
| DE | 3606363 A1 | 9/1987 |
| JP | 2003252448 A | 9/2003 |
| JP | 2004161475 A | 6/2004 |
| KR | 101430858 B1 | 8/2014 |

* cited by examiner

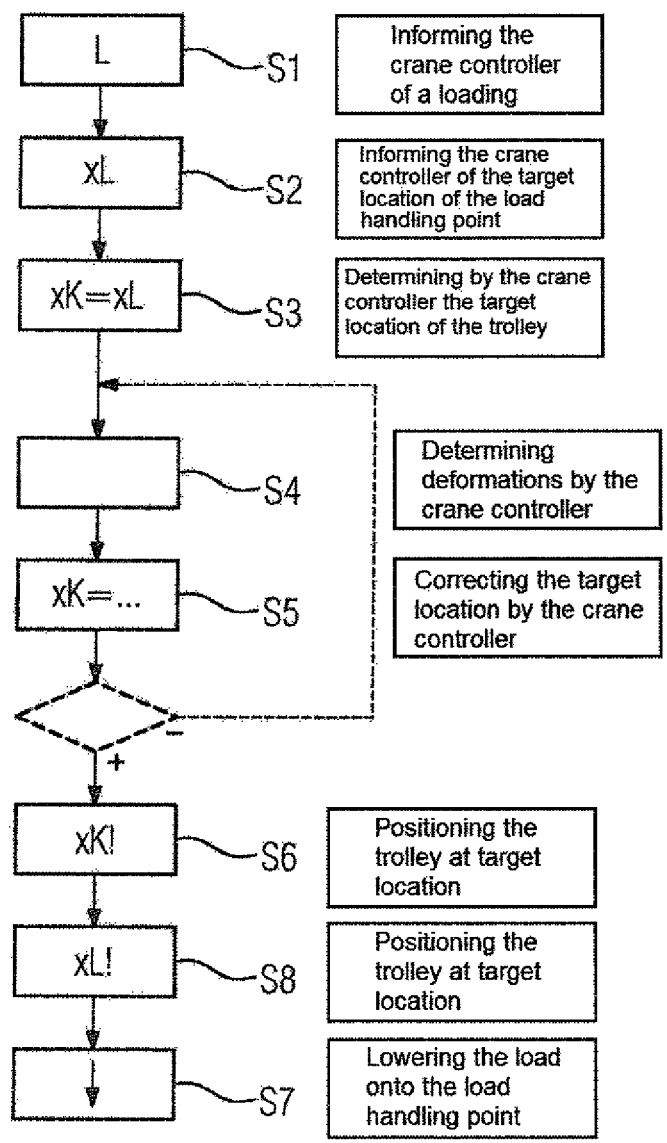

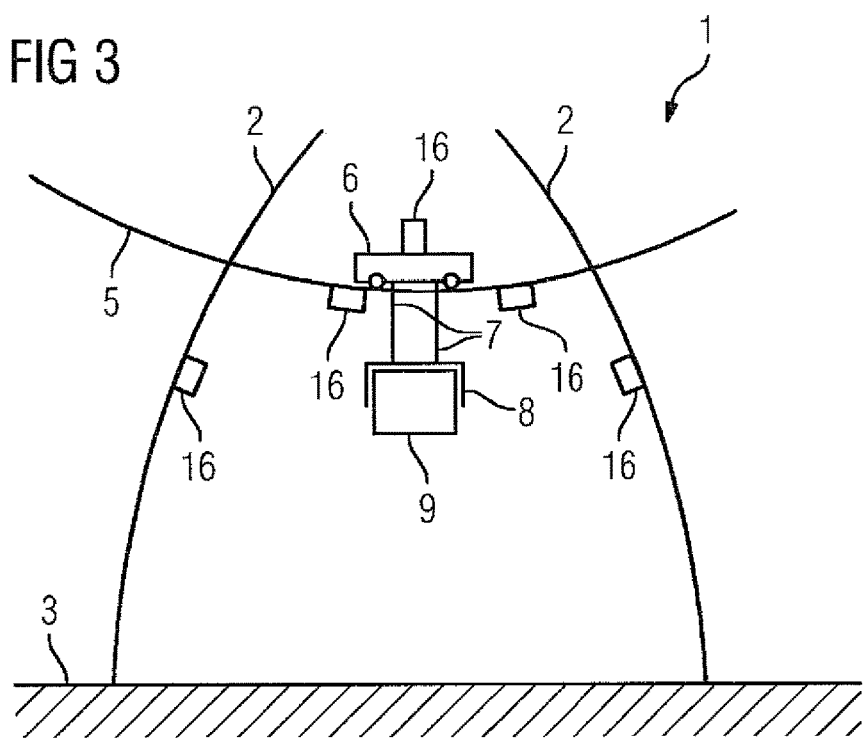
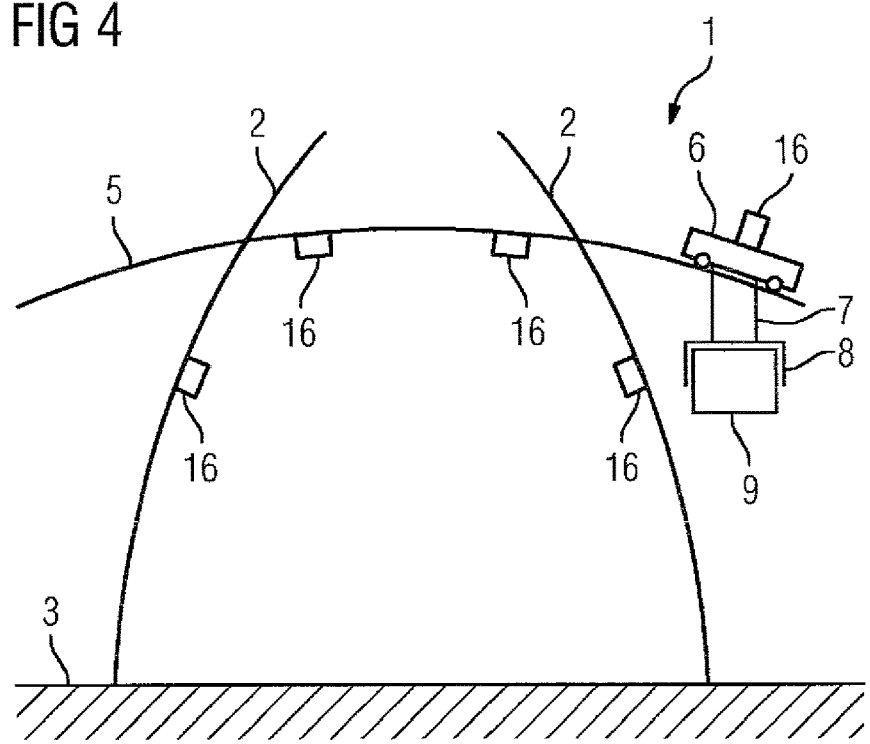

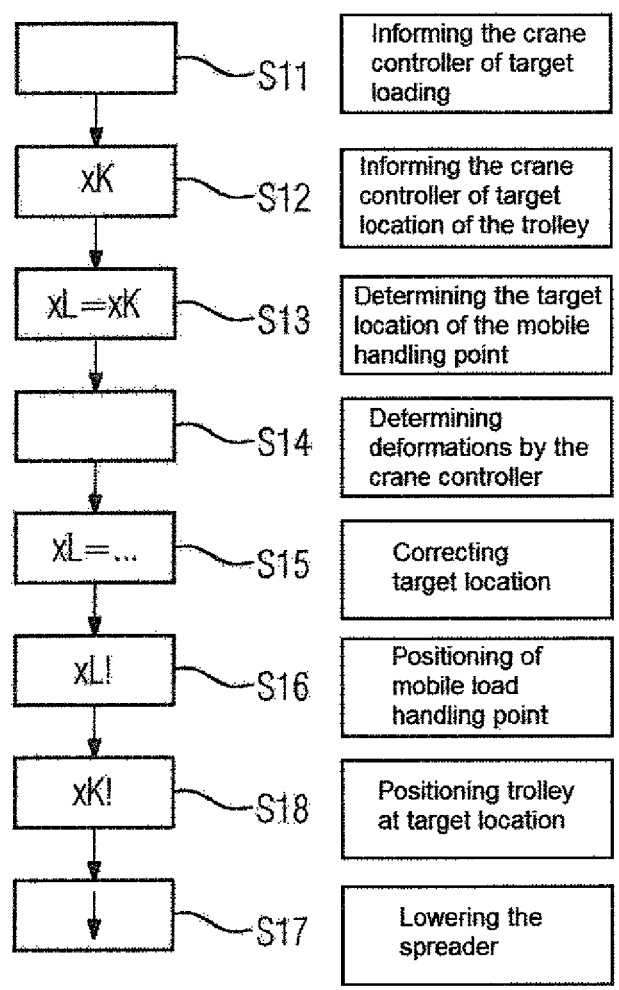

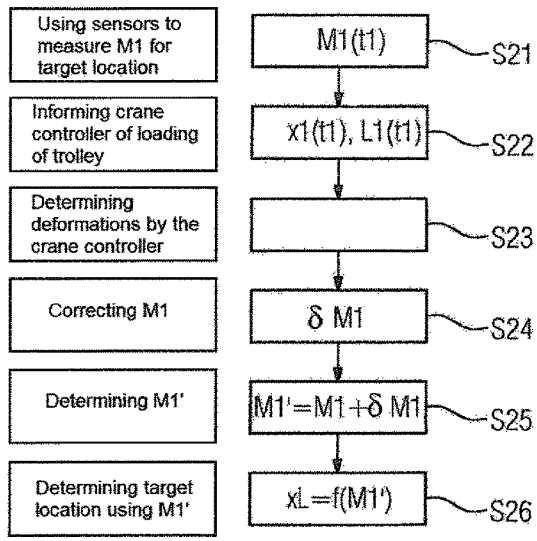
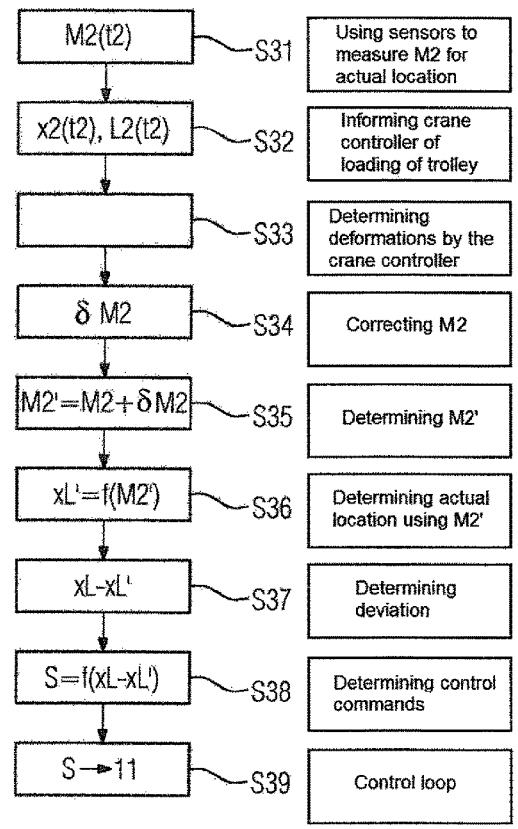

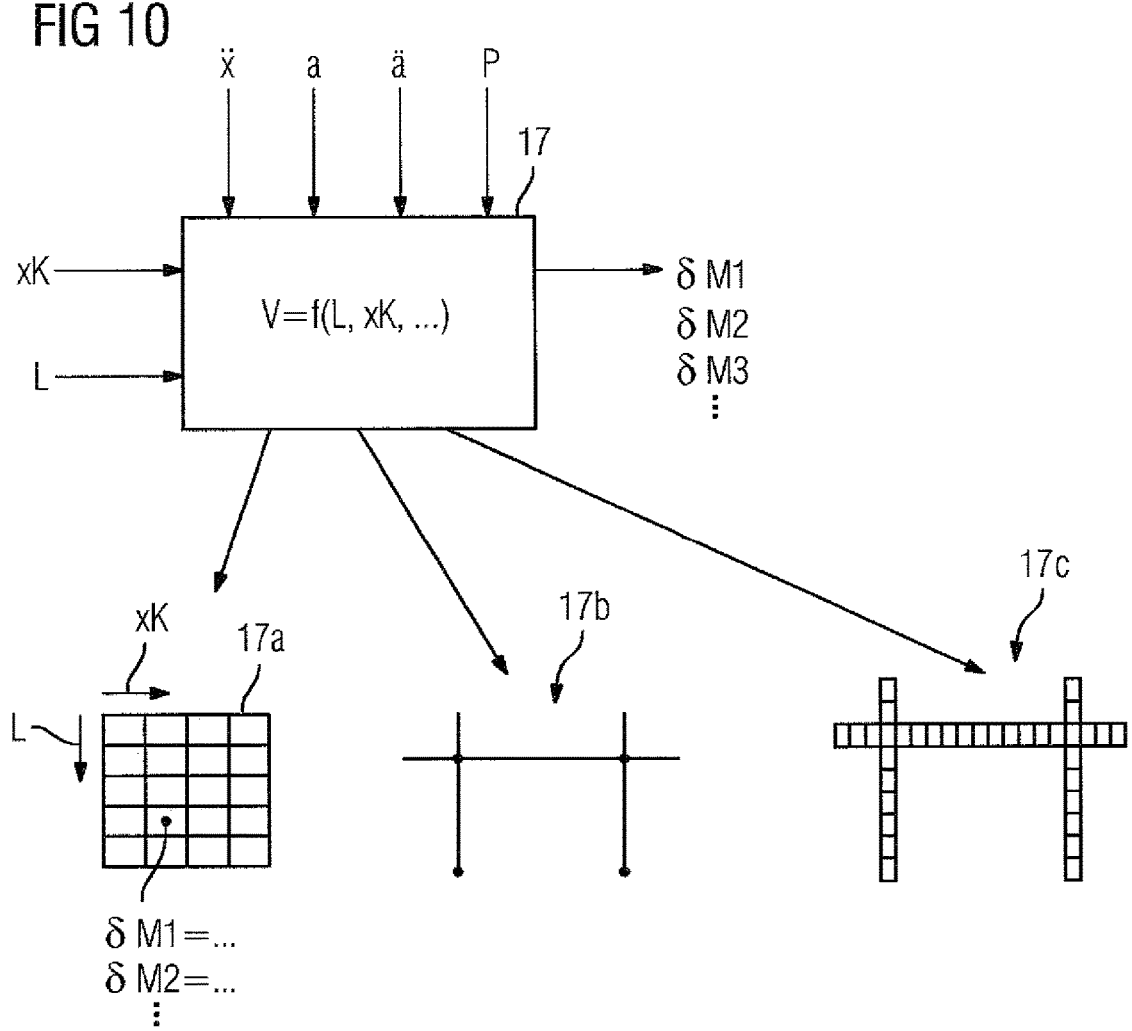

AUTOMATED CRANE CONTROLLER TAKING INTO ACCOUNT LOAD- AND POSITION-DEPENDENT MEASUREMENT ERRORS

CROSS-REFERENCES TO RELATED APPLICATIONS

This application is the U.S. National Stage of International Application No. PCT/EP2015/081439, filed Dec. 30, 2015, which designated the United States and has been published as International Publication No. WO 2016/128101 A1 and which claims the priority of European Patent Application, Serial No. 15154677.7, filed Feb. 11, 2015, pursuant to 35 U.S.C. 119(a)-(d).

BACKGROUND OF THE INVENTION

The present invention relates to a control method for a handling system, which comprises a container bridge arranged on a substrate, with a trolley, which can be moved on a crossmember of the container bridge relative to the substrate, and at least one load handling point arranged on the substrate,
  wherein a crane controller matches a target location of the trolley, which target location is related to the crossmember, and a target location of the load handling point, which target location is related to the substrate, to one another in such a way that, when the target load is lowered at the target location of the trolley, the target load is lowered onto the target location of the load handling point,
  wherein the crane controller positions the trolley at its target location,
  wherein, after positioning the trolley, the crane controller lowers the target load onto the load handling point and
  wherein, if the load handling point can be moved on the substrate and the load handling point is controlled by the crane controller, the crane controller positions the load handling point at its target location before lowering the target load onto the load handling point.

The present invention is furthermore based on a computer program comprising a machine code, which can be executed by a crane controller, wherein the execution of the machine code by the crane controller causes the crane controller to carry out such a control method.

The present invention further relates to a handling system,
  wherein the handling system comprises a container bridge arranged on a substrate with a crossmember,
  wherein the container bridge comprises a trolley, which can be moved on the crossmember relative to the substrate,
  wherein the handling system comprises at least one load handling point arranged on the substrate,
  wherein the handling system comprises a crane controller.

The operation of container bridges is becoming increasingly automated. During the automated operation of container bridges, it is in particular necessary to match the target location of the trolley and the target location of the load handling point exactly to one another. This is because only then is correct lowering of the load ensured.

During the operation of the container bridge, on the one hand, loads of different weights are moved. This is at the least the spreader and at the most the spreader plus a container with the maximum permissible weight. On the other hand, the corresponding positioning of the trolley results in different weight distributions on the container bridge. Deformation of the crane structure is established in dependence on at least these two causes. Due to the significant size of the container bridge, the resulting deviations are often no longer negligible. They repeatedly fluctuate within the centimeter range. Incorrect positioning of this order of magnitude often impedes successful automation of the operation of the container bridge.

Incorrect positioning is frequently compensated by the use of measuring systems. However, the measuring systems can only be configured for one single, static state of the container bridge. They cannot be followed up in relation to the positioning of the trolley on the crossmember and load acting on the trolley. Therefore, the use of measuring systems from the prior art does not resolve the problem.

SUMMARY OF THE INVENTION

The object of the present invention consists in the provision of possibilities by means of which it is possible to achieve highly accurate matching of the target position of the trolley and the target position of the handling point to one another for each load moved by means of the trolley.

According to one aspect of the invention the object is achieved by a control method for a handling system, which includes a container bridge arranged on a substrate with a trolley, which can be moved on a crossmember of the container bridge relative to the substrate, and at least one load handling point arranged on the substrate, wherein, taking into account at least one target loading with which the trolley is loaded at its target location, a crane controller matches a target location of the trolley, which target location is related to the crossmember, and a target location of the load handling point, which target location is related the substrate, to one another in such a way that, when the target load is lowered at the target location of the trolley, the target load is lowered onto the target location of the load handling point, wherein the crane controller positions the trolley at its target location, wherein, after positioning the trolley, the crane controller lowers the target load onto the load handling point, and wherein, if the load handling point can be moved on the substrate and the load handling point is controlled by the crane controller, the crane controller positions the load handling point at its target location before lowering the target load (8) onto the load handling point.

Advantageous embodiments of the control method are the subject matter of the dependent claims.

According to the invention, a control method for a handling system of the type named in the introduction is embodied in that,
  during the matching of the target location of the trolley and the target location of the load handling point, the crane controller also takes account of at least one target loading with which the trolley is loaded at its target location.

According to the invention, therefore, the target location of the trolley and the target load are used as the basis for the determination of a positioning error of the trolley that is established with respect to an absolutely rigid container bridge. This positioning error is then taken into account and corrected during the matching of the target location of the trolley and the target location of the handling point. Herein, if necessary and feasible, it is possible to correct the target location of the handling point or the target location of the trolley. If the target location of the trolley is corrected, usually one single correction is sufficient. Optionally, however, it is also alternatively possible to repeat corrections based on the corrected target location of the trolley until sufficient convergence is achieved.

It is possible, during the matching of the target location of the trolley and the target location of the load handling point to one another, for the crane controller first to know the target location of the load handling point. In this case, the crane controller determines the target location of the trolley taking into account at least the target location of the load handling point and the target loading.

It is possible for the target location of the load handling point to be known without any errors. For example, storage spaces on which containers are to be deposited or from which containers are to be received can be permanently predefined. In other cases, the target location of the load handling point is a variable quantity. For example, the load handling point can be arranged on an AGV (automated guided vehicle). In this case, it is not automatically ensured that the AGV is positioned exactly at a predetermined target location. In order nevertheless to achieve a correct determination of the target location of the trolley, it is possible

- for, at a first acquisition time point, sensors arranged on the container bridge to be used to acquire measured values for the target location of the load handling point,
- for the crane controller to determine the target location of the load handling point using the measured values for the target location of the load handling point taking into account at least one first acquisition location and one first acquisition loading,
- for the first acquisition location to be the location at which the trolley is located on the crossmember at the first acquisition time point and
- for the first acquisition loading to be the loading with which the trolley is loaded at the first acquisition time point.

This procedure enables, for example, account to be taken of sensor measurement errors resulting from deformations of the container bridge at the first acquisition time point, wherein these deformations are in turn dependent on the first acquisition location and the first acquisition loading.

In many cases, the first acquisition loading is identical to the target loading. However, this is not mandatorily necessary. One example: a container is to be received from a storage point, then the trolley positioned over an AGV by means of a suitable method and then deposited on the AGV. During the deposition/lowering of the container, the weight of the spreader functions in conjunction with the weight of the container as the target loading. If, at the first acquisition time point, the trolley has already received the container, the first acquisition loading is identical to the target loading. However, it is possible for the AGV to have already been acquired by means of the sensors, while the trolley handles another container or the trolley executes a no-load operation. In this case, the first acquisition loading is different from the target loading.

The first acquisition location can also be identical to the target location of the trolley. However, if this is the case, this conformity is purely random since the target location of the trolley is only determined after the determination of the target location of the load handling point.

It is possible for the crane controller to determine the deformation of the container bridge exclusively using the first acquisition location and the first acquisition loading and accordingly also to determine the corrections to the measured values supplied by the sensors resulting therefrom exclusively using the first acquisition location and the first acquisition loading. However, during the determination of the target location of the load handling point, preferably, the crane controller—always related to the first acquisition time point—takes account of at least one time derivative of the first acquisition location, a distance of a first acquisition load from the trolley, at least one time derivative of the distance of the first acquisition load from the trolley and/or an oscillation state of the first acquisition load relative to the trolley. The time derivatives can in particular be the second time derivatives (=accelerations). The oscillation state can in particular comprise the direction thereof, the amplitude thereof, the phase angle thereof and the oscillation frequency or the effective cable length that determines the oscillation frequency.

If the load handling point can be moved on the substrate by virtue of a corresponding actuation by the crane controller, it is alternatively possible, during the matching of the target location of the trolley and the target location of the load handling point to one another, for the crane controller first to know the target location of the trolley. In this case, the crane controller determines the target location of the load handling point taking into account at least the target location of the trolley and the target loading.

If the load handling point can be moved on the substrate by virtue of a corresponding actuation by the crane controller, it is possible for the positioning of the load handling point to be solely controlled by the crane controller. However, preferably, the control method is embodied such that,

- at a second acquisition time point, sensors arranged on the container bridge are used to acquire measured values for an actual location of the load handling point,
- the crane controller determines the actual location of the load handling point using the measured values for the actual location of the load handling point taking into account at least one second acquisition location and a second acquisition loading,
- the second acquisition location is the location at which the trolley is located on the crossmember at the second acquisition time point,
- the second acquisition loading is the loading with which the trolley is loaded at the second time point and
- the crane controller determines control commands for positioning the load handling point as a function of the deviation of the actual location determined of the load handling point from the target location of the load handling point.

This procedure makes it possible—similarly to sensor measurement errors at the first acquisition time point—for example to take account of sensor measurement errors resulting from deformations of the container bridge at the second time point, wherein these deformations are in turn dependent upon the second acquisition location and the second acquisition loading. The above statements relating to the measurement errors at the first acquisition time point are analogously applicable. This embodiment can be implemented regardless of which target location (that of the trolley or that of the load handling point) is first known to the crane controller. This embodiment can also be implemented regardless of whether, additionally to the load handling point, the trolley is also moved or not.

During the determination of the actual location of the load handling point, it is possible for the crane controller—always related to the second acquisition time point—to take account of at least one time derivative of the second acquisition location, a distance of a second acquisition load from the trolley, at least one time derivative of the distance of the second acquisition load from the trolley and/or an oscillation state of the second acquisition load relative to the trolley. This procedure is also similar to the procedure at the first acquisition time point.

It is possible to take account of loads and the site of action of the loads (=respective positioning the trolley) according to the invention exclusively for the correction of locations in a substantially horizontal plane (i.e. the substrate or the crossmember). It is however possible for the crane controller to correct a target height of the target load taking into account at least the target location of the trolley and the target loading and for the crane controller to lower the target load to the target height which it has corrected.

Therefore, during this procedure, account is taken of the degree to which the height of the crossmember above the substrate changes at the target location of the trolley due to the target loading.

In many cases, the target height of the target load will be constant. However, it can vary in some cases. In such cases it is possible for, at a third acquisition time point, sensors arranged on the container bridge to be used to acquire measured values for the target height, for the crane controller to determine the target height using the measured values for the target height taking into account at least one third acquisition location and a third acquisition loading, for the third acquisition location to be the location at which the trolley is located at the third acquisition time point on the crossmember and for the third acquisition loading to be the loading with which the trolley is loaded at the third acquisition time point.

As previously at the first and second acquisition time points—this procedure enables account to be taken of sensor measurement errors resulting from the deformations of the container bridge at the third acquisition time point, wherein these deformations are in turn dependent upon the third acquisition location and the third acquisition loading. The above statements relating to the measurement errors at the first acquisition time point are analogously applicable.

During the determination of the target height it is possible for the crane controller—always related to the third acquisition time point—to take account of at least one time derivative of the third acquisition location, a distance of a third acquisition load from the trolley, at least one time derivative of the distance of the third acquisition load from the trolley and/or an oscillation state of the third acquisition load relative to the trolley. This procedure is also similar to the procedure at the first acquisition time point.

The method in which the crane controller determines the necessary corrections can be implemented differently. For example, during the matching of the target location of the trolley and the target location of the load handling point to one another, it is possible for the crane controller to implement a model of the container bridge, which is at least dependent upon the respective loading of the trolley and the respective location of the trolley on the crossmember, wherein the model comprises a correction table, a rod support model of the container bridge and/or a model of the container bridge based on finite elements.

According to another aspect of the invention the object is furthermore achieved by a computer program including a machine code, which can be executed by a crane controller, wherein the execution of the machine code by the crane controller causes crane controller to carry out a control method as set forth above.

According to another advantageous embodiment, the computer program is stored in a memory in machine-readable form.

According to the invention, the execution of the machine code by the crane controller causes the crane controller to carry out a control method according to the invention. The computer program can in particular be stored in a memory in machine-readable form.

According to another aspect of the invention the object is furthermore achieved by a crane controller which is programmed with a computer program as set forth above.

According to the invention, the crane controller is programmed with a computer program according to the invention.

According to another aspect of the invention the object is furthermore achieved by a handling system including a container bridge arranged on a substrate with a crossmember, wherein the container bridge has a trolley, which can be moved on the crossmember relative to the substrate, wherein the handling system includes at least one load handling point arranged on the substrate, wherein the handling system includes a crane controller as set forth above.

BRIEF DESCRIPTION OF THE DRAWING.

The above-described properties, features and advantages of this invention and also the manner in which these are achieved will become clearer and more plainly comprehensible in conjunction with the following description of the exemplary embodiments explained in more detail in conjunction with the drawing. The drawings show in schematic form.

DETAILED DESCRIPTION OF PREFERRED EMBODIMENTS

Figure 1:
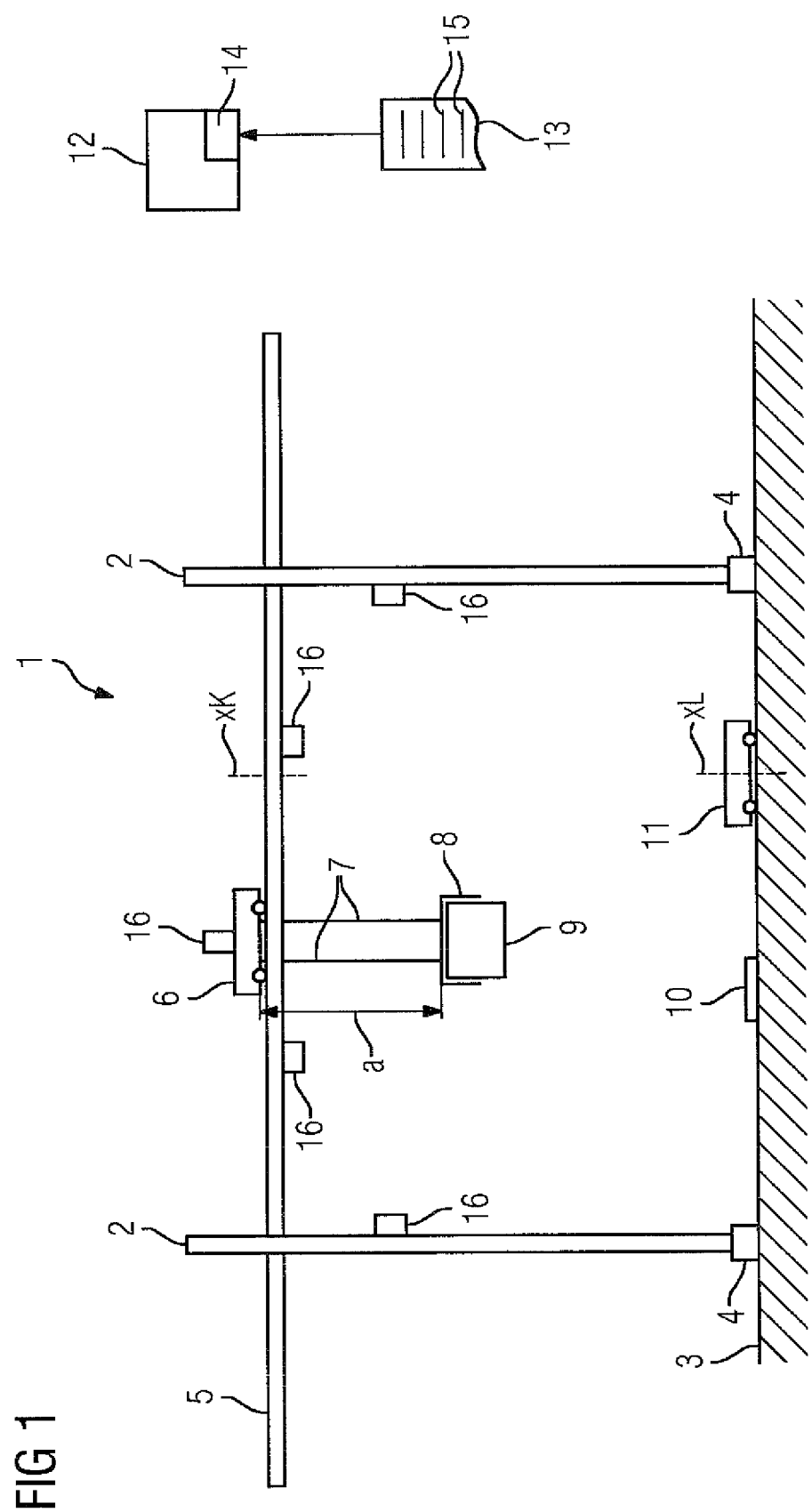
FIG. 1 a handling system,
FIG. 2 a flow diagram,
FIG. 3 a container bridge,
FIG. 4 a container bridge,
FIG. 5 a flow diagram,
FIG. 6 a flow diagram,
FIG. 7 a flow diagram,
FIG. 8 a flow diagram,
FIG. 9 a flow diagram, and
FIG. 10 a model of a container bridge.

According to FIG. 1, a handling system has a container bridge 1. The container bridge 1 has a plurality of support pillars 2 by means of which the container bridge 1 is arranged on a substrate 3. The substrate 3 is substantially horizontal. As a rule, the support pillars 2 can be moved on rails 4. The direction of movement is orthogonal to the depiction in FIG. 1, i.e. into or out of the image plane. The support pillars 2 bear a crossmember 5. The crossmember 5 extends parallel to the substrate 3 and hence also horizontally.

The container bridge 1 furthermore has a trolley 6. The trolley 6 can be moved on the crossmember 5 relative to the substrate. The direction of movement of the trolley 6 is horizontal and orthogonal to the direction of movement of the support pillars 2.

The trolley 6 is connected to a spreader 8 by means of a cable system 7. The spreader 8 can be lowered or raised by extending or shortening the cable system 7. Together with the spreader 8, a container 9, which is gripped by the spreader 8, is optionally also lowered or raised. At each time point, a respective current load of the trolley 6 corresponds to the weight of the spreader 8 plus the weight of the container 9 gripped by the spreader 8.

The following differentiates between the load of the trolley 6 and the loading thereof. The load is the object as such which is moved by the trolley 6, i.e. the spreader 8 with or without the container 9. The loading of the trolley 6 is the weight force exerted by the load on the trolley 6. If, for example, the trolley 6 moves the empty spreader 8 and the weight of the spreader 8 is 5 metric tons, the load of the spreader 8 and the loading is 5 metric tons. The difference between load and loading is also retained in the following in conjunction with compound terms, for example for a target load and a target loading or for an acquisition load and an acquisition loading.

The handling system has at least one load handling point 10, 11. The load handling point 10, 11 can, for example, be a permanently installed load handling point 10, i.e. a load handling point, which cannot be moved on the substrate 3. A typical example of such a handling point 10 is a storage space for a container 9. Alternatively, the load handling point 10, 11 can be a mobile load handling point 11, i.e. a load handling point, which can be moved on the substrate 3. A typical example of such a load handling point 11 is an AGV (automated guided vehicle).

The handling system furthermore has a crane controller 12. The crane controller 12 controls the handling system. The crane controller 12 is programmed with a computer program 13. The computer program 13 is in particular stored in a memory 14 of the crane controller 12 in machine-readable form. The computer program 13 comprises a machine code 15, which can be executed by the crane controller 12. The execution of the machine code 15 by the crane controller 12 causes the crane controller 12 to carry out a control method for the handling system, which is explained in more detail below.

According to FIG. 2, the crane controller 12 is informed of a loading L in a Step S1. The loading L is the loading with which the trolley 6 is loaded when the spreader 8—with or without containers 9—is lowered onto a load handling point 10, 11. Hereinafter, the loading L is referred to as the target loading.

The Step S1 can be implemented in different ways. For example, when the spreader 8 has previously been raised, it is possible to determine loading of a hoisting gear by means of which the cable system 7 is actuated. In this case, it is possible to determine the loading L from the loading of the hoisting gear. Alternatively, it is, for example, possible for the weight of the spreader 8 to be known to the crane controller 12. When the (empty) spreader 8 is to be lowered, the loading L corresponds to the weight of the spreader 8. When the spreader 8 is to be lowered together with a container 9, the crane controller 12 can be notified, for example by a user or a higher-ranking control system (neither shown in FIG) of the weight of the corresponding containers 9.

At this time point, i.e. when the spreader 8 is lowered, the trolley 6 is located on the crossmember 5 at a location xK. The location xK is a target location for the trolley 6. It is related to the crossmember 5, to be more precise to the direction of movement of the trolley 6 on the crossmember 5. The spreader 8 should be lowered (with or without containers 9) such that, when the spreader 8 is lowered at the target location xK of the trolley 6, the spreader 8 is lowered onto a location xL of the corresponding load handling point 10, 11. The location xL is a target location of the corresponding load handling point 10, 11. The target location xL of the corresponding load handling point 10, 11 is related to the substrate 3.

To ensure correct lowering of the spreader 8, the two target locations xK, xL must be matched to one another. The following describes one possible procedure for such matching in conjunction with Steps S2 to S8.

According to FIG. 2, in Step S2, the crane controller 12 is first informed of the target location xL of the load handling point 10, 11. For example, the corresponding target location xL can be notified to the crane controller 12 by the user or by the higher-ranking control system. Other procedures are also possible.

In Step S3, the crane controller 12 provisionally determines the corresponding target location xK of the trolley 6. The determination in Step S3 is an ideal determination. It is based on the assumption that the container bridge 1 is an absolutely rigid system. In this case, the target location xL of the load handling point 10, 11 can be adopted directly 1:1 as the target location xK of the trolley 6.

However, in practice, the container bridge 1 is an elastic system. Depending upon the position of the trolley 6 on the crossmember 5 and the loading L borne by the trolley 6 (and optionally depending upon further variables), therefore, deformations of the container bridge 1 occur. When for example—see FIG. 3—the trolley 6 is located in the center between the two support pillars 2, the crossmember 5 is bent downward in the center and upward at its edges. In correspondence thereto, the two support pillars 2 are inclined toward one another. When vice versa—see FIG. 4—the trolley 6 is located at an edge of its travel range on the crossmember 5, the crossmember 5 is bent upward in the center and downward at its edges. In correspondence thereto, the two support pillars 2 are inclined toward one another. These (and possibly also further) deformations are, as already mentioned, dependent upon both the position of the trolley 6 on the crossmember 5 and upon the loading L borne by the trolley 6. In practice, the deformations (which are shown greatly exaggerated in FIGS. 3 and 4), fluctuate within the range of a few centimeters. However, these are not negligible in the automated operation of the handling system. Therefore, the deformations are determined by the crane controller 12 in Step S4. Herein, the crane controller 12 takes account of the target location xK of the trolley 6 determined in Step S3 and the target loading L.

In Step S5, the crane controller 12 then corrects the target location xK determined in Step S3 taking into account the deformations of the container bridge 1 determined in Step S4. As a rule, one single correction will be completely sufficient. Alternatively, as indicated by dashed lines in FIG. 2, it is possible to pass through a loop consisting of Steps S4 and S5 until sufficient convergence is achieved.

Following correction of the target location xK, the crane controller 12 moves onto Step S6. In Step S6, the crane controller 12 positions the trolley 6 at the target location xK determined in Step S5. Then—i.e. after positioning the trolley 6 at its target location xK—in Step S7, the crane controller 12 lowers the load 8 (with or without containers 9) onto the load handling point 10, 11. If the load handling point 10, 11 is the mobile load handling point 11, furthermore, the load handling point 11 is positioned at its target location xL before the execution of Step S7. If the load handling point 11 is controlled by the crane controller 12, the corresponding positioning according to FIG. 2 is performed in a Step S8 by the crane controller 12.

Although the positioning of the load handling point 11 at its target location xL has to be performed before the execution of Step S7, it does not necessarily have to be performed immediately before the execution of Step S7. Therefore, Step S8 can be executed at any point within the sequence S1 to S7. However, it does have to be executed before Step S7.

In the context of the above explanations for FIG. 2, it was assumed that, during the matching of the target location xK of the trolley 6 and the target location xL of the load handling point 10, 11 to one another, the crane controller 12 first knows the target location xL of the load handling point 10, 11. Accordingly, in the context of the embodiment in FIG. 2, the crane controller 12 determines the target location xK of the trolley 6 taking into account at least the target location xL of the load handling point 10, 11 and the target loading L. However, when the load handling point 10, 11 is the mobile load handling point 11 and the mobile load handling point 11 can be moved on the substrate 3 by virtue of a corresponding actuation by the crane controller 12, the reverse procedure is also possible. It is also possible during the matching of the target location xK of the trolley 6 and the target location xL of the load handling point 11 to one another for the crane controller 12 to first know the target location xK of the trolley 6. In this case, the crane controller 12 determines the target location xL of the mobile load handling point 11 taking into account at least the target location xK of the trolley 6 and the target loading L. This is explained in more detail below in conjunction with FIG. 5.

According to FIG. 5—similarly to Step S1 in FIG. 2—in a Step S11, the crane controller 12 is informed of the target loading L. Then, the crane controller 12 is informed of the target location xK of the trolley 6 in a Step S12. For example, the corresponding target location xK can be notified to the crane controller 12 by the user or by the higher-ranking control system. It is also possible for the crane controller 12 to be informed of the target location xK during the positioning of the trolley 6 on the crossmember 5.

In a Step S13—analogously to Step S3 in FIG. 2—the crane controller 12 then provisionally determines the corresponding target location xL of the mobile load handling point 11. I.e. the target location xK of the trolley 6 is adopted directly 1:1 as the target location xL of the load handling point 10, 11.

In a Step S14,—similarly to Step S4 in FIG. 2—the crane controller 12 determines the deformations of the container bridge 1 that occur when the trolley 6 is positioned at its target location xK and loaded with the target loading L.

In Step S15, the crane controller 12 then corrects the target location xL determined in Step S13 taking into account the deformations of the container bridge 1 determined in Step S14. In the context of Step S15, one single correction results in an ideal correction.

Following the correction of the target location xL, the crane controller 12 moves onto Step S16. In Step S16, the crane controller 12 positions the mobile load handling point 11 to the target location xL determined in Step S15. Then—i.e. after positioning the mobile load handling point 11 at its target location xL—in Step S17, the crane controller 12 lowers the spreader 8 (with or without containers 9) onto the mobile load handling point 11.

Furthermore, before the execution of Step S17 by the crane controller 12, in a Step S18, the trolley 6 is positioned at its target location xK. The positioning of the trolley 6 at its target location xK has to be performed before the execution of Step S17. However, it does not necessarily have to be performed immediately before the execution of Step S17. Therefore, the Step S18 can be executed at any point within the sequence S11 to S17. However, it does have to be executed before Step S17.

In the context of the procedure in FIG. 2—see Step S2 therein—the crane controller 12 is informed of the target location xL of the load handling point 10, 11. This can take place in the context of Step S2, as already explained, in principle in any manner. The following explains in conjunction with FIG. 6 a possible embodiment of Step S2 in FIG. 2 with which the crane controller 12 automatically determines the target location xL of the load handling point 10, 11. The procedure in FIG. 6 is in particular advantageous when the load handling point 10, 11 is the mobile load handling point 11. However, it is in principle also applicable with a permanently installed load handling point 10.

In the context of the embodiment in FIG. 6—see FIG. 1—sensors 16 are arranged on the container bridge 1. According to FIG. 6, in a Step S21, the sensors 16 are used to acquire measured values M1 for the target location xL of the load handling point 10, 11. The acquisition is performed at an acquisition time point t1, hereinafter referred to as the first acquisition time point t1. The sensors 16 can, for example, be embodied as cameras, laser- or ultrasound-based distance measuring devices or the like.

According to FIG. 6, the crane controller 12 is furthermore informed in a Step S22 of an instantaneous location x1 the trolley 6 hereinafter referred to as the first acquisition location x1. The first acquisition location x1 of the trolley 6 is related to the crossmember 5. It can, for example, be acquired by means of a corresponding displacement-measuring system for the trolley 6. According to FIG. 6, in Step S22, the crane controller 12 is also informed of an instantaneous loading L1 of the trolley 6, hereinafter referred to as the first acquisition loading L1. Similarly to the target loading L in Step S1 in FIG. 2, the crane controller 12 can be informed of the first acquisition loading L1. Both the first acquisition location x1 and the first acquisition loading L1 are related to the first acquisition time point t1. Therefore, the first acquisition location x1 is the location at which the trolley 6 is located on the crossmember 5 at the first acquisition time point t1. Similarly, the first acquisition loading L1 is the loading with which the trolley 6 is loaded at the first acquisition time point t1.

In a Step S23—similarly to Step S4 in FIG. 2—the crane controller 12 determines the deformations of the container bridge 1 that occur when the trolley 6 is positioned at the first acquisition location x1 and loaded with the first acquisition loading L1. Then, in a Step S24, the crane controller 12 determines, taking account of the deformations of the container bridge 1, correction quantities δM1 for the measured values M1. In a Step S25, the crane controller 12 determines, using the correction quantities δM1 determined in Step S24, corrected measured values M1'. Finally, in a Step S26, the crane controller 12 determines, using the corrected measured values M1', the target location xL of the load handling point 10, 11.

In the context of the procedure in FIG. 5—see Step S16 therein—and possibly also in the context of the procedure in FIG. 2—see Step S8 therein—the mobile load handling point 11 is positioned by the crane controller 12. Hereinafter, a possible embodiment of Step S8 in FIG. 2 and Step S16 in FIG. 5 is explained in conjunction with FIG. 7.

In the context of the embodiment in FIG. 7—similarly to the embodiment in conjunction with FIG. 6—the sensors 16 are arranged on the container bridge 1. According to FIG. 7, in a Step S31, the sensors 16 are used to acquire measured values M2 for an actual location xL' of the mobile load handling point 11. The acquisition is performed at an acquisition time point t2, hereinafter referred to as the second acquisition time point t2.

According to FIG. 7, the crane controller 12 is furthermore informed in a Step S32 of an instantaneous location x2 of the trolley 6 hereinafter referred to as the second acquisition location x2. The second acquisition location x2 of the trolley 6 is related to the crossmember 5. It can, for example, be acquired by means of a corresponding displacement-measuring system for the trolley 6. According to FIG. 7, in Step S32, the crane controller 12 is also informed of an instantaneous loading L2 of the trolley 6, hereinafter referred to as the second acquisition loading L2. The crane controller 12 can be informed of the second acquisition loading L2 similarly to the target loading L in Step S1 in FIG. 2. Both the second acquisition location x2 and the second acquisition loading L2 are related to the second acquisition time point t2. Therefore, the second acquisition location x2 is the location at which the trolley 6 is located on the crossmember 5 at the second acquisition time point t2. Similarly, the second acquisition loading L2 is the loading with which the trolley 6 is loaded at the second time point t2.

In a Step S33—similarly to Step S4 in FIG. 2—the crane controller 12 determines the deformations of the container bridge 1 that occur when the trolley 6 is positioned at the second acquisition location x2 and is loaded with the second acquisition loading L2. Then in a Step S34—similarly to Step S24 in FIG. 6—the crane controller 12 determines, taking account of the deformations of the container bridge 2, correction quantities δM2 for the measured values M2. In a Step S35,—similarly to Step S25 in FIG. 6—the crane controller 12 determines, using the correction quantities δM2 determined in Step S34, corrected measured values M2'. Finally, in a Step S36, the crane controller 12 determines, using the corrected measured values M2'—similarly to Step S26 in FIG. 6—the actual location xL' of the mobile load handling point 11.

In a Step S37, the crane controller 12 determines the deviation of the actual location xL' determined of the mobile load handling point 11 from the target location xL of the mobile load handling point 11. In a Step S38, the crane controller 12 determines, depending on the deviation determined in Step S37, control commands S for the positioning of the mobile load handling point 11. Furthermore, a corresponding actuation the mobile load handling point 11 is performed in a Step S39.

Steps S31 to S39 are often incorporated in a repeatedly executed control loop. Solely for reasons of clarity, this is not shown in FIG. 7.

In the above explanation, the correction of the target locations xK, xL and the actual location xL' is restricted to the direction of movement of the trolley 6. However, the above-explained procedures can be automatically extended to orthogonal horizontal direction thereto. The corresponding procedures are exactly the same as the above-described procedures. It is also possible to apply similar procedures with respect to the lowering of the load 8. This is explained in more detail below in conjunction with FIG. 8.

Figure 8:
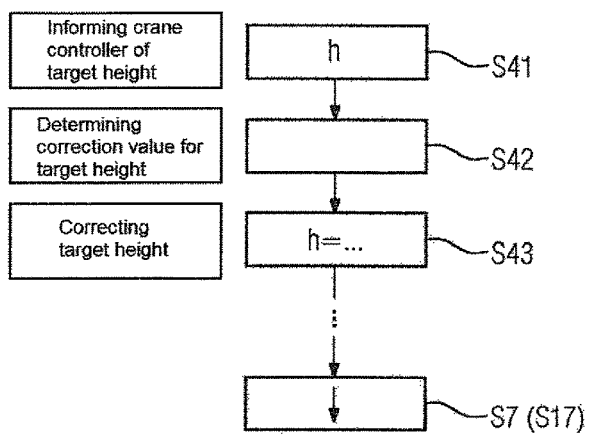

FIG. 8 shows a possible extension of Step S7 in FIG. 2 or Step S17 in FIG. 5. This extension takes place upstream of Step S7 in FIG. 2 or Step S17 in FIG. 5.

According to FIG. 8, in a Step S41, the crane controller 12 is informed of a target height h of the target load 8. The target height h can alternatively be related to the substrate 3 or the trolley 6. It can, for example, be notified to the crane controller 12 by virtue of a specification by the user, by virtue of a specification by a higher-ranking control device or by virtue of its own measurements.

In a Step S42, the crane controller 12 determines, based on the deformations of the container bridge 1, a correction value for the target height h. Step S42 can be part of Step S4 in FIG. 2 or of Step S14 in FIG. 5. In a Step S43, the crane controller 12 corrects the target height h by the correction value determined in Step S42.

Following the correction of the target height h, Step S7 in FIG. 2 or Step S17 in FIG. 5 is executed. Herein, the target load 8 is lowered to the target height h corrected by the crane controller 12.

Figure 9:
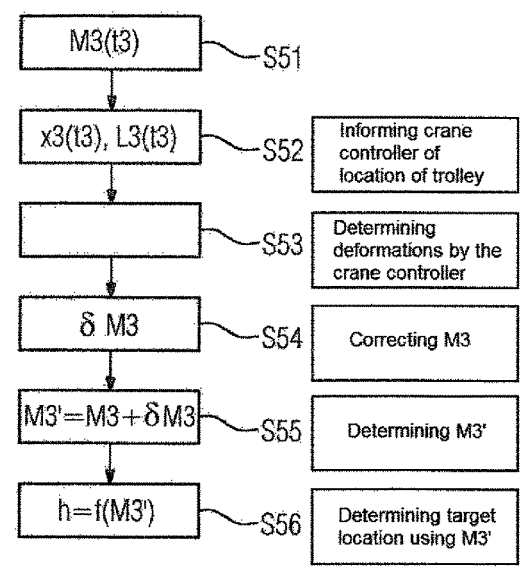

In the context of the procedure in FIG. 8—see Step S41 therein—the crane controller 12 is informed of the target height h. Hereinafter, a possible embodiment of Step S41 in FIG. 8 is explained in conjunction with FIG. 9 with which the crane controller 12 determines the target height h automatically. The procedure in FIG. 9 is in particular advantageous when the load handling point 10, 11 is the mobile load handling point 11. However, it can, in principle, also be applied with a permanently installed load handling point 10.

Similarly to the embodiment in conjunction with FIG. 6, in the context of the embodiment in FIG. 9, the sensors 16 are arranged on the container bridge 1. According to FIG. 9, in a Step S51, the sensors 16 are used to acquire measured values M3 for the target height h. The acquisition is performed at an acquisition time point t3, hereinafter referred to as the third acquisition time point t3. The sensors 16 can be the same sensors as described above in conjunction with FIGS. 6 and 7.

According to FIG. 9, furthermore in a Step S52, the crane controller 12 is informed of an instantaneous location x3 of the trolley 6, hereinafter referred to as the third acquisition location x3. The third acquisition location x3 of the trolley 6 is related to the crossmember 5. It can, for example, be acquired by means of a corresponding displacement-measuring system for the trolley 6. According to FIG. 9, in Step S52, the crane controller 12 is also informed of an instantaneous loading L3 of the trolley 6, hereinafter referred to as the third acquisition loading L3. The crane controller 12 can be informed of the third acquisition loading L3 similarly to the target loading L in Step S1 in FIG. 2. Both the third acquisition location x1 and the third acquisition loading L3 are related to the third acquisition time point t3. Therefore, the third acquisition location x3 is the location at which the trolley 6 is located on the crossmember 5 at the third acquisition time point t3. Similarly, the third acquisition loading L3 is the loading with which the trolley 6 is loaded at the third acquisition time point t3.

In a Step S53, the crane controller 12 determines—similarly to Step S4 in FIG. 2—the deformations of the container bridge 1 that occur when the trolley 6 is positioned at the third acquisition location x3 and is loaded with the third acquisition loading L3. Taking account of the deformations of the container bridge 1, the crane controller 12 then determines in a Step S54—similarly to Step S24 in FIG. 6—correction quantities δM3 for the measured values M3. In a Step S55, the crane controller 12 determines—similarly to Step S25 in FIG. 6—using the correction quantities δM3 determined in Step S54, corrected measured values M3'. Finally the crane controller 12 determines in a Step S56, using the corrected measured values M3'—similarly to Step S26 in FIG. 6—the corrected target height h.

In order to determine the deformations of the container bridge 1 dependent on the location of the trolley 6 and the loading of the trolley 6, the crane controller 12 implements a model 17 according to FIG. 10. The implementation can in particular be performed by the execution of the computer program 13. According to FIG. 10, the model 17 is supplied with at least the respective location of the trolley 6 and the respective loading of the trolley 6 as input variables. In FIG. 10, this is depicted for the target location xK of the trolley 6 and the target loading L. However, the model 17 can alternatively however also be supplied with another location and the associated loading, for example the first acquisition location x1 and the first acquisition loading L1 or the second acquisition location x2 and the second acquisition loading L2 or the third acquisition location x3 and the third acquisition loading L3.

The model 17 uses the input variables supplied to it to determine a state of deformation V. The state of deformation V can be used to determine a wide variety of correction quantities, for example changes to the positioning and/or orientation of the sensors 16 and a change to the position of the trolley 6 in the horizontal and vertical direction. Changes to the positioning and/orientation of the sensors 16 can, for example, be used to determine the corresponding correction quantities δM1, δM2, δM3 when the model 17 is supplied with the first acquisition location x1 and the first acquisition loading L1 or the second acquisition location x2 and the second acquisition loading L2 or the third acquisition location x3 and the third acquisition loading L3 as input variables. A change to the position of the trolley 6 in the horizontal direction can be used to correct the target location xL of the load handling point 10, 11 or to correct the target location xK of the trolley 6 when the model 17 is supplied with the target location xK of Step S3 in FIG. 2 or Step S12 in FIG. 5 and the target loading L as input variables. Regardless of whether one or more of these procedures are adopted, the crane controller 12 uses the model 17 during the matching of the target location xK of the trolley 6 and the target location xL of the load handling point 10, 11 to one another.

The model 17 as such can, for example, comprise a correction table 17a. In this case, the correction table 17a has a multi-dimensional structure, namely one dimension per input variable. Although the correction table 17a is only defined for specific support points, linear or nonlinear interpolation between support points is possible in a manner that is known per se. Alternatively, the model 17 can be embodied as a rod support model 17b of the container bridge 1. In another alternative, the model 17 can be embodied as a model 17c of the container bridge 1 based on finite elements. Further embodiments and combinations of the models 17a, 17b, 17c are also possible.

In the above description, the correction is furthermore performed exclusively using a respective location xK, x1, x2, x3 of the trolley 6 and the respective associated loading L, L1, L2, L3 of the trolley 6. However, where the determination of correction quantities δM1, δM2, δM3 for the measured values M1, M2, M3 acquired by the sensors 16 is concerned, it is possible for the crane controller 12—always related to the respective acquisition time point t1, t2, t3—to take account of further variables. These variables can, for example, according to the depiction in FIG. 10, be the following variables:

At least one time derivative of the respective acquisition location x1, x2, x3 in particular the second time derivative (=acceleration) of the respective acquisition location x1, x2, x3.

A distance a of the respective load 8 from the trolley 6, as a result, therefore, an effective cable length.

At least one time derivative of the respective distance a of the respective acquisition load 8, in particular the second time derivative of the distance a. This variable substantially corresponds to the value with which a raising or lowering speed of the load 8 is changed.

An oscillation state P of the load 8 relative to the trolley 6. The oscillation state P can in particular comprise the effective cable length, the direction and the amplitude of the oscillating movement and the phase angle of the oscillating movement.

To summarize, the present invention hence relates to the following:

A handling system comprises a bridge 1 arranged on a substrate 3 container and at least one load handling point 10, 11 arranged on the substrate 3. The container bridge 1 has a trolley 6 which can be moved on a crossmember 5 of the container bridge 1 relative to the substrate 3. A crane controller 12 matches a target location xK of the trolley 6 related to the crossmember 5 and a target location xL of the load handling point 10, 11 related to the substrate 3 to one another in such a way that, when the target load 8 is lowered at the target location xK of the trolley 6, the target load 8 is lowered onto the target location xL of the load handling point 10, 11. The matching is performed while additionally taking into account at least one target loading L with which the trolley 6 is loaded at its target location xK. The crane controller 12 positions the trolley 6 at its target location xL. Furthermore, said crane controller, after positioning the trolley 6, lowers the target load 8 onto the load handling point 10, 11. If the load handling point 11 can be moved on the substrate 3 and the load handling point 11 is controlled by the crane controller 12, the crane controller 12 further positions the load handling point 11 at its target location xL before lowering the target load 8 onto the load handling point 11.

The present invention has many advantages. In particular, highly accurate positioning of the trolley 6 relative to the load handling point 10, 11 is possible in a simple and reliable manner. Furthermore, it is automatically possible to retrofit an existing crane controller known from the prior art.

Although the invention has been illustrated and described in greater detail by the preferred exemplary embodiment, the invention is not restricted by the disclosed examples and other variations can be derived herefrom by the person skilled in the art without departing from the scope of protection of the invention.

What is claimed is:

1. A control method for a handling system which includes a container bridge arranged on a substrate with a trolley that is movable on a crossmember of the container bridge relative to the substrate, and at least one load handling point arranged on the substrate, said method comprising:

when the trolley is loaded at a target location by a target loading, matching by a crane controller the target location of the trolley on the crossmember with a target location of a load handling point on the substrate such that a target load is lowered onto the target location of the load handling point, when the target load is lowered at the target location of the trolley;

positioning the trolley at the target location by the crane controller;

subsequently lowering the target load onto the load handling point by the crane controller; and positioning the load handling point at the target location before the target load is lowered onto the load handling point, when the load handling point is movable on the substrate and the load handling point is controlled by the crane controller.

2. The control method of claim 1, further comprising:
informing the crane controller about the target location of the load handling point during matching of the target location of the trolley with the target location of the load handling point; and
determining by the crane controller the target location of the trolley in dependence on the target location of the load handling point and the target loading.

3. The control method of claim 1, further comprising:
acquiring at a first acquisition time point measured values for the target location of the load handling point by sensors arranged on the container bridge; and
when the trolley is located on the crossmember at a first acquisition location at the first acquisition time point and loaded by a first acquisition loading at the first acquisition time point, determining by the crane controller the target location of the load handling point in dependence on the measured values for the target location of the load handling point.

4. The control method of claim 3, further comprising when determining the target location of the load handling point, determining by the crane controller at the first acquisition time point at least one member selected from the group consisting of a time derivative of the first acquisition location, a distance of the target load from the trolley, a time derivative of the distance of the target load from the trolley, and an oscillation state of the target load relative to the trolley.

5. The control method of claim 1, further comprising:
moving the load handling point on the substrate in response to an actuation by the crane controller;
informing the crane controller about the target location of the trolley during matching of the target location of the trolley with the target location of the load handling point; and
determining by the crane controller the target location of the load handling point in dependence on the target location of the trolley and the target loading.

6. The control method of claim 1, further comprising:
moving the load handling point on the substrate in response to an actuation by the crane controller;
acquiring at a second acquisition time point measured values for an actual location of the load handling point by sensors arranged on the container bridge;
when the trolley is located on the crossmember at a second acquisition location at the second acquisition time point and loaded by a second acquisition loading at the second acquisition time point, determining by the crane controller the actual location of the load handling point in dependence on the measured values for the actual location of the load handling point; and
determining by the crane controller control commands for positioning the load handling point as a function of a deviation of the actual location determined of the load handling point from the target location of the load handling point.

7. The control method of claim 6, further comprising when determining the actual location of the load handling point, determining by the crane controller at the second acquisition time point at least one member selected from the group consisting of a time derivative of the second acquisition location, a distance of the target load from the trolley, a time derivative of the distance of the target load from the trolley, and an oscillation state of the target load relative to the trolley.

8. The control method of claim 1, further comprising:
correcting by the crane controller a target height of the target load in dependence on the target location of the trolley and the target loading; and
lowering by the crane controller the target load to the corrected target height.

9. The control method of claim 8, further comprising:
acquiring at a third acquisition time point measured values for the target height by sensors arranged on the container bridge; and
when the trolley is located on the crossmember at a third acquisition location at the third acquisition time point and loaded by a third acquisition loading at the third acquisition time point, determining by the crane controller the target height in dependence on the measured values for the target height.

10. The control method of claim 9, further comprising when determining the target height, determining by the crane controller at the third acquisition time point at least one member selected from the group consisting of a time derivative of the third acquisition location, a distance of the target load from the trolley, a time derivative of the distance of the target load from the trolley, and an oscillation state of the target load relative to the trolley.

11. The control method of claim 1, further comprising:
storing a model of the container bridge in the crane controller, with the model including at least one member selected from the group consisting of a correction table, a rod support model of the container bridge, and a model of the container bridge based on finite elements; and
during matching of the target location of the trolley with the target location of the load handling point, implementing by the crane controller the model of the container bridge in dependence on a loading of the trolley and a location of the trolley on the crossmember.

12. A computer program embodied in a non-transitory computer readable medium, said computer program comprising machine code which, when executed by a crane controller, causes the crane controller to carry out a control method as set forth in claim 1.

13. The computer program of claim 12, stored in a memory in a machine-readable form.

14. A crane controller, comprising a computer program embodied in a non-transitory computer readable medium, said computer program comprising machine code which, when executed by the crane controller, causes the crane controller to carry out a control method as set forth in claim 1.

15. A handling system, comprising:
a container bridge arranged on a substrate, said container bridge including a crossmember and a trolley movable on the crossmember relative to the substrate;
a load handling point arranged on the substrate; and
a crane controller comprising a computer program embodied in a non-transitory computer readable medium, said computer program comprising machine code which, when executed by the crane controller, causes the crane controller to carry out a control method as set forth in claim 1.

* * * * *